Feb. 19, 1935.  L. DURGEN  1,991,847
FILTER
Original Filed Dec. 20, 1932
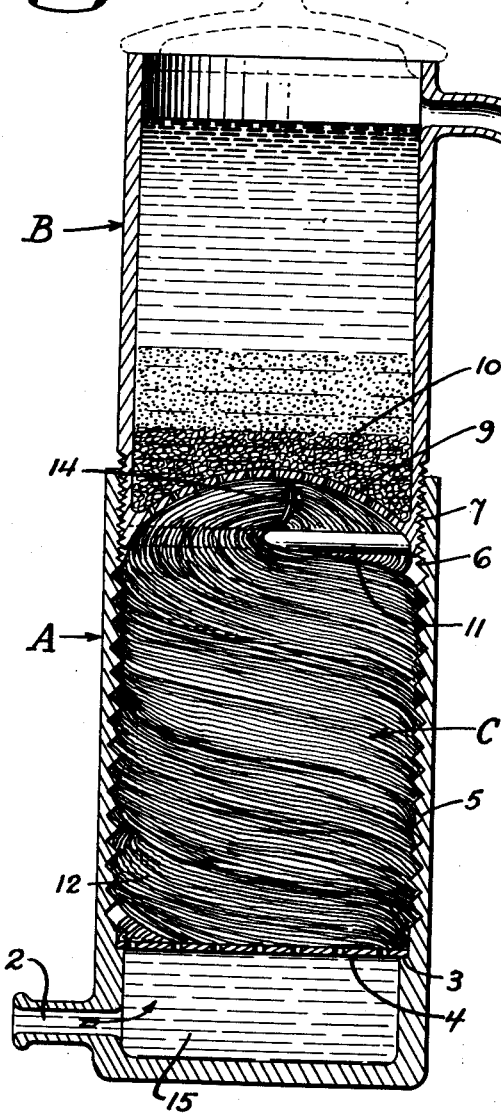
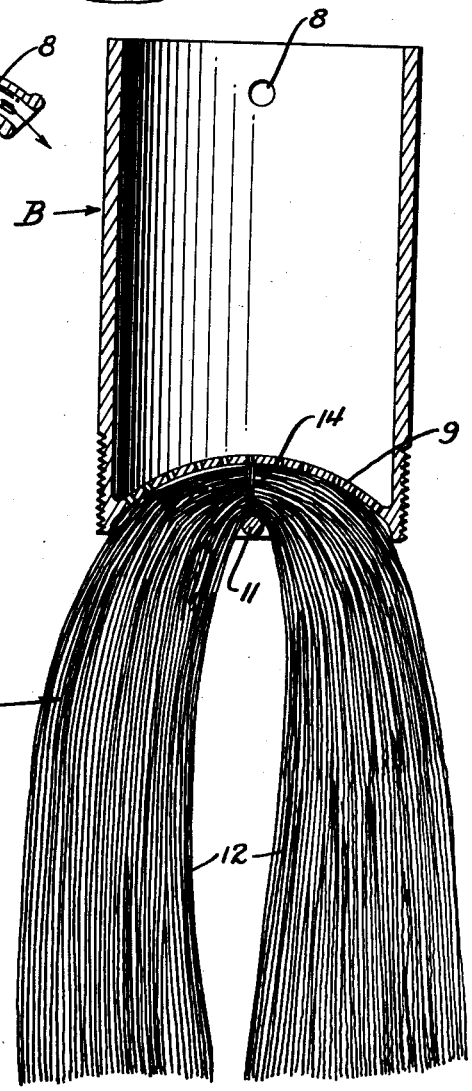
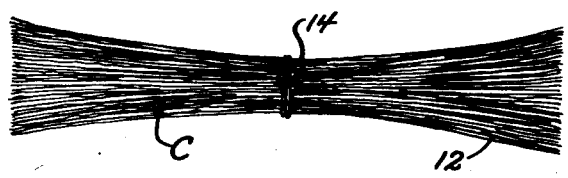
INVENTOR.
Leo Durgen.
BY Townsend & Loftus
ATTORNEYS.

Patented Feb. 19, 1935

1,991,847

UNITED STATES PATENT OFFICE 1,991,847

FILTER

Leo Durgen, San Francisco, Calif.

Application December 20, 1932, Serial No. 648,071
Renewed July 13, 1934

4 Claims. (Cl. 210—85)

This invention relates to a filter for filtering liquids, such as water or the like, to remove foreign matter therefrom and particularly to the filtering medium employed.

The object of the present invention is to generally improve and simplify the construction and operation of filters; to provide a filter which is compact and cheap to manufacture; to provide a filtering medium which is efficient in operation; to provide a filtering medium which is readily placed in the filter or removed therefrom for cleaning and sterilizing the same; to provide means for securing and compressing the filtering medium to vary the density thereof; and further to provide a filtering medium which may be so cheaply manufactured that replacement and renewal can be resorted to at frequent intervals.

The filter and the filter medium employed are shown by way of illustration in the accompanying drawing, in which—

Fig. 1 is a central vertical section of the filter showing the filtering medium in position for operation.

Fig. 2 is a section at right angles to Fig. 1, showing the upper section of the filter with the filtering medium attached thereto.

Fig. 3 is a plan view of the filter medium.

Referring to the drawing in detail, and particularly Fig. 1, A indicates a cylindrical-shaped elongated casing having an inlet 2. Formed interior of the casing is a shoulder 3 upon which is supported a perforated plate 4. Also formed interior of the casing is a coarse thread 5 which extends from the point 6 downwardly to the perforated plate 4, and above the same is formed a fined thread 7 for the reception of a second casing generally indicated at B. This is also elongated and cylindrical in shape and the lower end is threaded to permit it to be engaged with the threads 7.

The upper end of the casing B may be opened and it may be provided with a cover, such as indicated in dotted lines, which is provided merely for the purpose of excluding dust. The upper end is also provided with a discharge opening 8 from which filtered water is discharged. The bottom of the casing B, indicated at 9, is convex in shape and perforated to permit water, or other fluid to be filtered, to pass therethrough and coarse gravel and charcoal may be supported by the bottom section, as indicated at 10. This, however, is not necessary but may be employed if desired.

A bar 11 formed integral with the bottom section 9, or suitably secured thereto, is provided for the purpose of supporting and securing the filtering medium generally indicated at C. The filtering medium consists of a skein of string, or a like fibrous material, such as indicated at 12, of suitable length which is tied centrally, as indicated at 14, to prevent separation thereof. The filtering medium is in reality nothing but a bundle of comparatively short sections of string made of cotton or any similar material. One end of the bundle is passed over the bar 11 and it is pulled over the bar until the tie portion 14 registers with the bar so that the strings will bend and form a U-shape, as shown in Fig. 2, and will present ends of substantially equal length. With the filtering medium attached to the bottom of section B, as described, it is inserted in the upper end of the cylinder A and compacted by hand. The cylinder B is then screwed into the casing and as it is screwed down it compresses the strings and the degree of compression, or in other words the density of the filtering medium, is controlled by the distance the casing B is screwed downwardly into the upper end of the casing A.

With the filtering medium in place and suitably compressed, a suitable connection is made between a water faucet and the inlet 2, for instance by a short hose connection not here shown. When the water is turned on it enters the lower chamber 15 of the casing A, then passes through the perforated plate 4 and upwardly through the filtering medium, then through the perforated bottom plate 9 and the gravel, sand, or charcoal supported thereby, and when the casing B is filled the water will overflow through the discharge outlet 8; the volume of water passing through the filter depending upon the pressure of the water and the density presented by the filtering medium C.

A filter constructed in the manner described is exceedingly simple and cheap to manufacture and operate. It can be readily cleaned from time to time as it is only necessary to unscrew the casing B to lift the filtering medium out of the casing. The bundle of strings may be pulled free of the bar 11, and when removed, may be washed and it may be sterilized, if desired, by placing it in boiling water, after which it may again be placed in position and used over and over. Inasmuch as the filtering medium merely consists of a hank or skein of cotton yarn, strings, or the like, tied together, as shown at 14, it is obvious that it may be cheaply manufactured and sold and the filtering medium may thus be readily renewed from time to time. The coarse threads 5 formed on the interior surface of the casing A are desirable as the filtering medium comprising the threads or strings are compressed by screwing the casing B into the upper end of the casing A. This requires a turning movement of the upper casing B and the threads thus become twisted or helically arranged within the casing A. The coarse threads 5 engage the strings during this compressing action and tend to screw the strings downwardly against the plate 4, thus assisting in compressing or compacting the same. Furthermore, the coarse threads form a corrugated surface which resists flow of water around the filtering medium, thus preventing short circuiting of the water, or in other words passage of the water through the casing A without passing through the filtering medium.

While this and other features have been more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. A filter comprising an elongated cylindrical-shaped casing having a bottom and open at the upper end, said casing having an inlet adjacent the bottom, a perforated plate disposed within the casing above the inlet, a second casing adapted to be screwed into the upper end of the first named casing, said second casing having a perforated bottom and a skein of string-like fibrous material adapted to be compressed between the perforated plate and the perforated bottom of the second named casing, said string-like fibrous material forming a filter body, and means for securing the skein with relation to the second named casing so that when said second casing is screwed into the first named casing the skein will be rotated and helically twisted.

2. A filter comprising an elongated cylindrical-shaped casing having a bottom and open at the upper end, said casing having an inlet adjacent the bottom, a perforted plate disposed within the casing above the inlet, a second casing adapted to be screwed into the upper end of the first named casing, said second casing having a perforated bottom and a skein of string-like fibrous material adapted to be compressed between the perforated plate and the perforated bottom of the second named casing, said string-like fibrous material forming a filter body, means for securing the skein with relation to the second named casing so that when said second casing is screwed into the first named casing the skein will be rotated and helically twisted, and corrugations formed on the inner surface of the first named casing.

3. A filter comprising an elongated cylindrical-shaped casing having a bottom and open at the upper end, said casing having an inlet adjacent the bottom, a perforated plate disposed within the casing above the inlet, a second casing adapted to be screwed into the upper end of the first named casing, said second casing having a perforated bottom and a skein of string-like fibrous material adapted to be compressed between the perforated plate and the perforated bottom of the second named casing, said string-like fibrous material forming a filter body, means for securing the skein with relation to the second named casing so that when said second casing is screwed into the first named casing the skein will be rotated and helically twisted, and a coarse thread formed on the inner surface of the first named casing.

4. A filter comprising an elongated cylindrical-shaped casing having a bottom and open at the upper end, said casing having an inlet adjacent the bottom, a perforated plate disposed within the casing above the inlet, a second casing adapted to be screwed into the upper end of the first named casing, said casing having a perforated bottom and said bottom presenting a concave surface, a bar extending crosswise of the convex bottom, and a skein of string-like fibrous material hung on the bar and adapted to be compressed between the perforated plate and the perforated bottom of the second named casing, said string-like fibrous material forming a filter body and adapted to be helically twisted when the second named casing is screwed into the first named casing.

LEO DURGEN.